United States Patent
Lee

(10) Patent No.: US 8,233,901 B2
(45) Date of Patent: Jul. 31, 2012

(54) METHOD AND SYSTEM OF PROVIDING PERSONAL INFORMATION CONTROL SERVICE FOR MOBILE COMMUNICATION TERMINAL

(75) Inventor: Kyoung Haak Lee, Seoul (KR)

(73) Assignee: Ssomon Co., Ltd., Seoul (KR)

( * ) Notice: Subject to any disclaimer, the term of this patent is extended or adjusted under 35 U.S.C. 154(b) by 119 days.

(21) Appl. No.: 12/866,483

(22) PCT Filed: Feb. 27, 2009

(86) PCT No.: PCT/KR2009/000933
§ 371 (c)(1),
(2), (4) Date: Aug. 6, 2010

(87) PCT Pub. No.: WO2009/107994
PCT Pub. Date: Sep. 3, 2009

(65) Prior Publication Data
US 2011/0003581 A1 Jan. 6, 2011

(30) Foreign Application Priority Data

Feb. 28, 2008 (KR) .......... 10-2008-0018195
Feb. 26, 2009 (KR) .......... 10-2009-0016420

(51) Int. Cl.
*H04M 3/42* (2006.01)
(52) U.S. Cl. .......... 455/435.2; 455/414.1; 455/466; 455/412.2
(58) Field of Classification Search .......... 455/403, 455/411, 410, 412.1, 414.1, 466, 412.2, 418, 455/419, 420, 565, 567, 435.2
See application file for complete search history.

(56) References Cited

U.S. PATENT DOCUMENTS

| 6,151,510 | A * | 11/2000 | Zicker ............. 455/414.1 |
| 7,181,252 | B2* | 2/2007 | Komsi ............. 455/567 |
| 7,640,005 | B2* | 12/2009 | Matsumoto et al. ......... 455/411 |
| 2003/0013491 | A1* | 1/2003 | Moriki ............. 455/564 |
| 2004/0192256 | A1* | 9/2004 | Kuwajima ............. 455/411 |
| 2005/0153685 | A1* | 7/2005 | Choi ............. 455/411 |
| 2006/0258333 | A1* | 11/2006 | Yang et al. ............. 455/412.1 |

(Continued)

FOREIGN PATENT DOCUMENTS
KR 10-2005-0086980 8/2005
(Continued)

*Primary Examiner* — Jean Gelin
(74) *Attorney, Agent, or Firm* — Occhiuti Rohlicek & Tsao LLP

(57) ABSTRACT

A method and system for providing a personal information control service for a mobile communication terminal are disclosed. The method for providing personal information control service for a mobile communication terminal includes: transmitting, by a service client, a loss registration control command to a service operating system; notifying, by the service operating system, that a mobile communication terminal of a user has been lost by using one of a method of transmitting a particular form of loss control message to the user mobile communication terminal and a method of originating a call using a particular origination number to the user mobile communication terminal in response to the loss registration control command; and activating, by a control agent provided in the user mobile communication terminal, a service function of the control agent to protect personal information of the mobile communication terminal based on the notification about the loss. When the mobile communication terminal is lost, it can be controlled by transmitting a particular form of message or originating a call using a particular origination number.

28 Claims, 11 Drawing Sheets

U.S. PATENT DOCUMENTS

| | | | |
|---|---|---|---|
| 2007/0021103 A1* | 1/2007 | Zhao et al. | 455/410 |
| 2007/0082705 A1* | 4/2007 | Jain et al. | 455/558 |
| 2007/0202848 A1* | 8/2007 | Ishikawa et al. | 455/411 |
| 2008/0070561 A1* | 3/2008 | Keum et al. | 455/419 |
| 2008/0194296 A1* | 8/2008 | Roundtree | 455/558 |
| 2009/0036095 A1* | 2/2009 | Bickerstaff et al. | 455/411 |
| 2009/0054044 A1* | 2/2009 | Ikemori et al. | 455/414.2 |
| 2009/0075630 A1* | 3/2009 | McLean | 455/411 |
| 2009/0265552 A1* | 10/2009 | Moshir et al. | 713/168 |
| 2010/0216428 A1* | 8/2010 | Jain et al. | 455/410 |
| 2011/0119357 A1* | 5/2011 | Lindholm et al. | 709/220 |

FOREIGN PATENT DOCUMENTS

| | | |
|---|---|---|
| KR | 10-2007-0006483 | 1/2007 |
| KR | 10-2007-0043163 | 4/2007 |

* cited by examiner

Paging channel Message(Utilizing Directed Message)

| Message Length | Message Body | CRC |
|---|---|---|

Utilizing Burst type value
(Identification information+Control command)

Forward Message on Traffic Channel (BS→terminal)

| Mixed Mode(1bit) | Traffic Type(1bit) | Traffic Mode(2bit) | Primary Traffic(80bit) | Secondary Traffic(88bit) |
|---|---|---|---|---|

Identification information
+Control command

METHOD AND SYSTEM OF PROVIDING PERSONAL INFORMATION CONTROL SERVICE FOR MOBILE COMMUNICATION TERMINAL

CROSS-REFERENCE TO RELATED APPLICATIONS

This application is the National Stage of International Application No. PCT/KR2009/000933, filed on Feb. 27, 2009, which claims the priority date of Korean Application No. 10-2008-0018195, filed on Feb. 28, 2008 and Korean Application No. 10-2008-0016420, filed Feb. 26, 2009 the contents of which is hereby being incorporated by reference in their entirety.

BACKGROUND OF THE INVENTION

1. Field of the Invention

The present invention relates to a method and system for providing a personal information control service for a mobile communication terminal and, more particularly, to a remote control technique through mobile communication capable of controlling a lost mobile communication terminal by sending a particular message or originating a call using a particular origination number to thus protect personal information, and a security technique of a mobile communication terminal.

2. Description of the Related Art

In general, a mobile communication terminal refers to a portable terminal providing a call function via a mobile communication network, and in Korea, it is commonly called a 'mobile phone'. In the past, the mobile communication terminal simply serves as a wireless telephone, but recently, multi-functional terminals have been configured to provide complex functions such as functions of cameras, camcorders, personal digital assistants (PDAs), game players, video call services, navigation devices, and the like.

As the functions of the mobile communication terminal are diversified, the mobile communication terminals are increasingly recognized as important information devices such as personal network computers, not simply as communication terminals. For example, users may capture and store images, video, sounds or voices, watch movie or broadcast programs or play games while on the move, or manage their schedules. In addition, users may perform a video call with a counterpart in a remote area or may utilize mobile communication terminals as navigation devices in a vehicle.

Actually, these days, a growing number of users rely mobile communication terminals for many portions of daily life, and store a significant amount of personal information in their mobile communication terminals. Thus, when a user has lost his mobile communication terminal, his personal information may be leaked and illegally used as well as a financial loss. In particular, recently, payments or Internet banking through mobile phones are generalized, the loss of mobile communication terminals may lead to a serious damage.

The Financial News issued in 2005 revealed that 15 million mobile communication terminals were lost in 1999 and 45 million ones in 2004, showing the tendency that the number of lost mobile communication terminals is sharply increasing. Meanwhile, a survey showed that a recovery rate of lost mobile communication terminals was merely 5 percent.

Currently, in Korea, a basic service is domestically provided to allow a user who has lost his mobile communication terminal to contact a pertinent communication provider to limit a call origination function of the lost mobile communication terminal. Further, there is also provided a solution of preventing an unauthorized manipulation of a lost mobile communication terminal by applying a password thereto. In this case, however, the security of the password is not highly guaranteed, making the mobile communication terminal weak to a malicious attack. In addition, because users should input the password each time they use the mobile communication terminal, most users would rather not use such function.

Thus, a technique for ensuring the security of the mobile communication terminal when it is lost is required. In particular, if mobile communication terminals are compatible with each other through a universal subscriber identity module (USIM) or the like, there is a high possibility that a malicious incident would occur beyond a simple loss or being stolen of mobile communication terminals, for which, thus, a measure in preparation for lost mobile communication terminals is urgent. In particular, a technique for protecting personal information such as phone numbers, memo, photo images, certificates, and the like, by preventing a leakage of the personal information is required.

SUMMARY OF THE INVENTION

An object of the present invention is to provide a method for providing a personal information control service for a mobile communication terminal capable of controlling a lost mobile communication terminal by sending a particular form of control message or originating a call using a particular origination number to thereby protect personal information stored in the lost mobile communication terminal.

Another object of the present invention is to provide a system for providing a personal information control service for a mobile communication terminal capable of controlling a service agent of a lost mobile communication terminal to control the lost mobile communication terminal to thereby protect personal information stored in the lost mobile communication terminal.

Still another object of the present invention is to provide a control apparatus capable of protecting personal information of a mobile communication terminal according to an external control signal.

To achieve the above objects, in one aspect, there is provided a method for providing a personal information control service for a mobile communication terminal, including: transmitting, by a service client, a loss registration control command to a service operating system; notifying, by the service operating system, that a mobile communication terminal of a user has been lost by using one of a method of transmitting a particular form of loss control message to the user mobile communication terminal and a method of originating a call using a particular origination number to the user mobile communication terminal in response to the loss registration control command; and activating, by a control agent provided in the user mobile communication terminal, a service function of the control agent to protect personal information of the mobile communication terminal based on the notification about the loss.

The method for providing a personal information control service for a mobile communication terminal may further include: transmitting, by the service client, an operation control command to the service operating system; transmitting, by the service operating system, control information to the user mobile communication terminal by using one of a method of transmitting a particular form of operation control message to the user mobile communication terminal and a method of originating a call using a particular origination number for identifying (i.e., discerning, discriminating) the operation control command to the user mobile communication terminal in response to the operation control command; and controlling, by the control agent provided in the user mobile communication terminal, the user the mobile communication terminal according to the control information.

To achieve the above objects, in another aspect, there is provided a method for providing a personal information control service for a mobile communication terminal, including: transmitting, by a service client, a loss registration control command, to a service operating system; configuring, by the service operating system, a loss notification control message in the form of an SMS message or a particular channel message in response to the loss registration control command; transmitting the configured loss notification control message to a user mobile communication terminal; and receiving, by a control agent provided in the user mobile communication terminal, the loss notification control message, and activating a service function of the control agent to protect personal information of the user mobile communication terminal.

To achieve the above objects, in still another aspect, there is provided a method for providing a personal information control service for a mobile communication terminal, including: transmitting, by a service client, a loss registration control command to a service operating system; originating, by the service operating system, a call to a user mobile communication terminal by using a particular origination number in response to the loss registration control command; analyzing, by a control agent provided in the user mobile communication terminal, the origination number; and activating a service function of the control agent to protect personal information of the user mobile communication terminal based on the analysis.

To achieve the above objects, in yet another aspect, there is provided a system for providing a personal information control service for a mobile communication terminal, including: a service client that transmits a control command to protect personal information of a user mobile communication terminal; a service operating system that receives the control command from the service client, and transmits control information to the user mobile communication terminal by using at least one of a method of configuring a particular form of control message corresponding to the control command and transmitting the same to the user mobile communication terminal and a method of originating a call to the user mobile communication terminal by using an origination number for identifying the control command; and a control agent that is provided in the user mobile communication terminal and transitions to an active state based on the control information to perform a service function to protect information of the user mobile communication terminal.

To achieve the above objects, in another aspect, there is provided a control apparatus provided in a user mobile communication terminal, including: a state controller configured to change the control apparatus into an active state if a loss notification control message transmitted from an external particular system is received or if a call from an activation origination number is received; and a function controller driven in the active state and controls the user mobile communication terminal if an operation control message transmitted from the particular system is received or if a call from an operation control origination number is received.

According to the embodiments of the present invention, when a mobile communication terminal is lost, the mobile communication terminal is controlled by transmitting a particular form of SMS message, a paging channel message, a traffic channel message, and the like, or originating a call using a particular origination number. Thus, personal information stored in the lost mobile communication terminal can be reliably protected.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Embodiments of the present invention now will be described more fully hereinafter with reference to the accompanying drawings in which embodiments of the invention are shown, such that they may be easily conducted by the person in the art to which the present invention pertains. Particular technical terms are used to clarify content of the embodiments of the present invention. However, it will be understood that the present invention is not limited to such selected particular terms and each particular term includes every other technical synonyms operating in a similar manner to achieve similar purposes.

Figure 1:
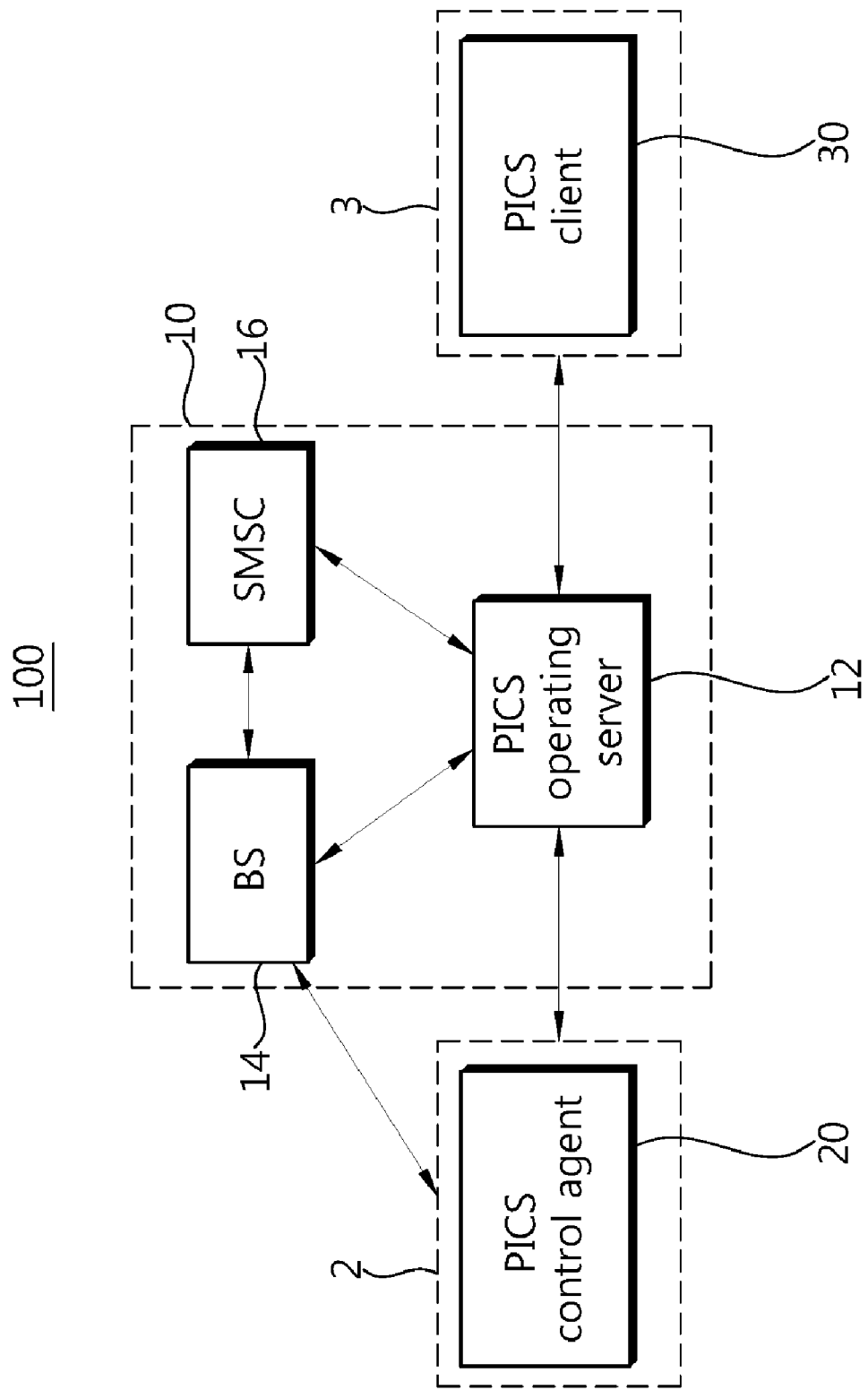
FIG. 1 is a schematic block diagram showing the configuration of a personal information control service (PICS) providing system for realizing a PICS for a mobile communication terminal according to an exemplary embodiment of the present invention.

FIG. 1 is a schematic block diagram showing the configuration of a personal information control service (PICS) providing system for realizing a PICS for a mobile communication terminal according to an exemplary embodiment of the present invention.

As shown in FIG. 1, a PICS providing system 100 may include a PICS client 30, a PICS operating system 10, and a PICS control agent 20.

The PICS client 30 may be provided in a client terminal 3. The client terminal 3 may refer to a personal computer (PC), a notebook computer, a mobile communication terminal, and the like, having a wired/wireless network access function. The PICS client 30 may be installed in the form of a software module in the client terminal 3, and may transmit/receiver information by interworking with the PICS operating system 10 via a particular protocol, e.g., a TCP/IP.

For example, when a user has lost his mobile communication terminal 2, the PICS client 30 may receive a control command for protecting personal information stored in the user mobile communication terminal 2 and transmit the same to the PICS operating system 10. In this case, the control command may include a loss registration control command, an operation control command, and the like. In addition, the PICS client 30 may receive a control result in response to the transmitted control command from the PICS operating system 10, and display the same to the user.

The PICS operating system 10 may be provided at the side of a service provider or a mobile communication provider. The PICS operating system 10 serves to configure a PICS control message according to the control command received from the PICS client 30, and transmit the configured PICS control message to the PICS control agent 20 installed in the user mobile communication terminal 2 via a mobile communication network, and the like.

The PICS control message may include a loss notification control message or an operation control message. The loss notification control message may refer to a PICS control message configured in response to a loss registration control command transmitted from the PICS client 3. When the loss notification control message is transmitted to the user mobile communication terminal 2, service functions of the PICS control agent 20 provided in the user mobile communication terminal 2 are activated. Meanwhile, the operation control message may refer to a PICS control message configured in response to an operation control command transmitted from the PICS client 30. When the operation control message is transmitted to the user mobile communication terminal 2, the PICS control agent 20 may control the mobile communication terminal according to a corresponding control command.

The PICS operating system 10 may transmit the PICS control message in the form of a short message service (SMS) message, a paging channel message, a traffic channel message, a TCP/IP communication message, or the like. The transmission form of the PICS control message will be described in detail later.

The PICS operating system 10 may originate a call to the mobile communication by using a particular origination number, namely, a PICS origination number, according to the control command received from the PICS client 30. To this end, the PICS operating system 10 may include an Internet phone with the PICS origination number allocated thereto.

The PICS origination number may include an activation origination number or an operation control origination number. The activation origination number may refer to an origination number to be used in response to the loss registration control command transmitted from the PICS client 3. When a call using the activation origination number is received by the mobile communication terminal 3, the service functions of the PICS control agent 20 provided in the user mobile communication terminal 2 are activated. Meanwhile, the operation control origination number may refer to an origination number to be used correspondingly according to the operation control command transmitted from the PICS client 30.

When a call using the operation control origination number is received by the user mobile communication terminal 2, the PCIS control agent 20 may control the mobile communication terminal according to a control command corresponding to a pertinent origination number.

The PICS operating system 10 may include a PICS operating server 12, and a base station (BS) 14, a short message service center (SMSC) 16.

The PICS operating server 12 may interwork with the PICS client 30 and the PICS control agent 20 through wireline/wireless (radio) TCP/IP communication. The PICS operating server 12 receives the control command, i.e., the loss registration control command, the operation control command, and the like, from the PICS client 30, and transfers the same to the BS 24 or to the SMSC 16. In addition, the PICS operating server 12 may receive a result obtained from performing the control command, i.e., the control result, from the PICS control agent 30, and transmit the same to the PICS client 30.

Also, the PICS operating server 12 may provide a service Web page of the PICS to the PICS client 230. The service Web page provides a user interface allowing the user to use the PICS. Namely, the service Web page allows the user to easily input a loss registration request, an operation control request, and the like, and display the information about the control result. The user may access the service Web page of the PICS provided by the PICS operating server 12 via the PICS client 30 to input a control command, and recognize a corresponding control result.

Meanwhile, when a control command is received from the PCIS client 30, the PICS operating server 12 may originate a call by using a pre-set particular origination number by interworking with the BS 14 to the mobile communication terminal 2. The PICS operating server 12 may include an Internet phone with the particular number allocated thereto.

The BS 14 may receive a control command from the PICS operating server 12. In this case, the BS 14 may receive the control command from the PICS operating server 12. In this case, the BS 14 inserts information including the control command into a particular portion of a paging channel or a traffic channel to configure a PICS control message, and transmits the PICS control message to the PICS control agent 20 of the user mobile communication terminal 2. Meanwhile, when the call using the particular origination number is generated from the PICS operating server 12 to the mobile communication terminal 2, the BS 14 may page the call.

The SMSC 16 may receive a control command from the PICS operating server 12. In this case, the SMSC 16 creates a particular form of SMS message including the control command to configure a PICS control message, and transmits the PICS control message to the BS 14. Then, the BS 14 transmits the PICS control message transmitted from the SMSC 16 to the PICS control agent 20 of the user mobile communication terminal 2.

The PICS control agent 20 may be provided in the user mobile communication terminal 2. The user mobile communication terminal 2 may be a mobile device such as a mobile phone, a PMP, a WiBro terminal, a navigation device, a PDA, an MP3 player, a UMPC, and the like, that receives an SMS and performs wireless communication. The PICS control agent 20 may be installed in the form of software module in the user mobile communication terminal 2.

A service function of the PICS control agent 20 may be activated according to a particular PICS control message, e.g., the loss notification control message, transmitted from the PICS operating system 10. In addition, the PICS control agent may control the user mobile communication terminal 2 according to a PICS control message, e.g., the operation control message, transmitted via the mobile communication network from the PICS operating system 10.

The PICS control agent 20 analyzes the origination number of the call received by the user mobile communication terminal 2, and if the origination number is a PICS origination number, the PCIS control agent 20 may activate its service function or perform a controlling operation corresponding to the PICS origination number.

For example, if the origination number of the call received by the user mobile communication terminal 2 is an activation origination number, the PICS control agent 20 may activate its service function. Also, if the origination number of the call received by the user mobile communication terminal 2 is an operation control origination number, the PICS control agent 20 may perform a corresponding controlling operation.

The PICS control agent 20 may interwork with the PICS operating system 10 via radio TCP/IP communication. In this case, the PICS control agent 20 may control the user mobile communication terminal 2 according to an operation control message transmitted via a TCP/IP communication network, or may transmit the control result to the PICS operating system 10. The configuration and service function of the PICS control agent 20 will be described in detail later.

The PICS providing system of the mobile communication terminal according to an exemplary embodiment of the present invention has been described. The PICS providing system may provide the PCIS service through various service scenarios. Hereinafter, a PICS providing procedure according to several embodiments will now be described.

<First Embodiment of PICS Providing Procedure>

Figure 2:
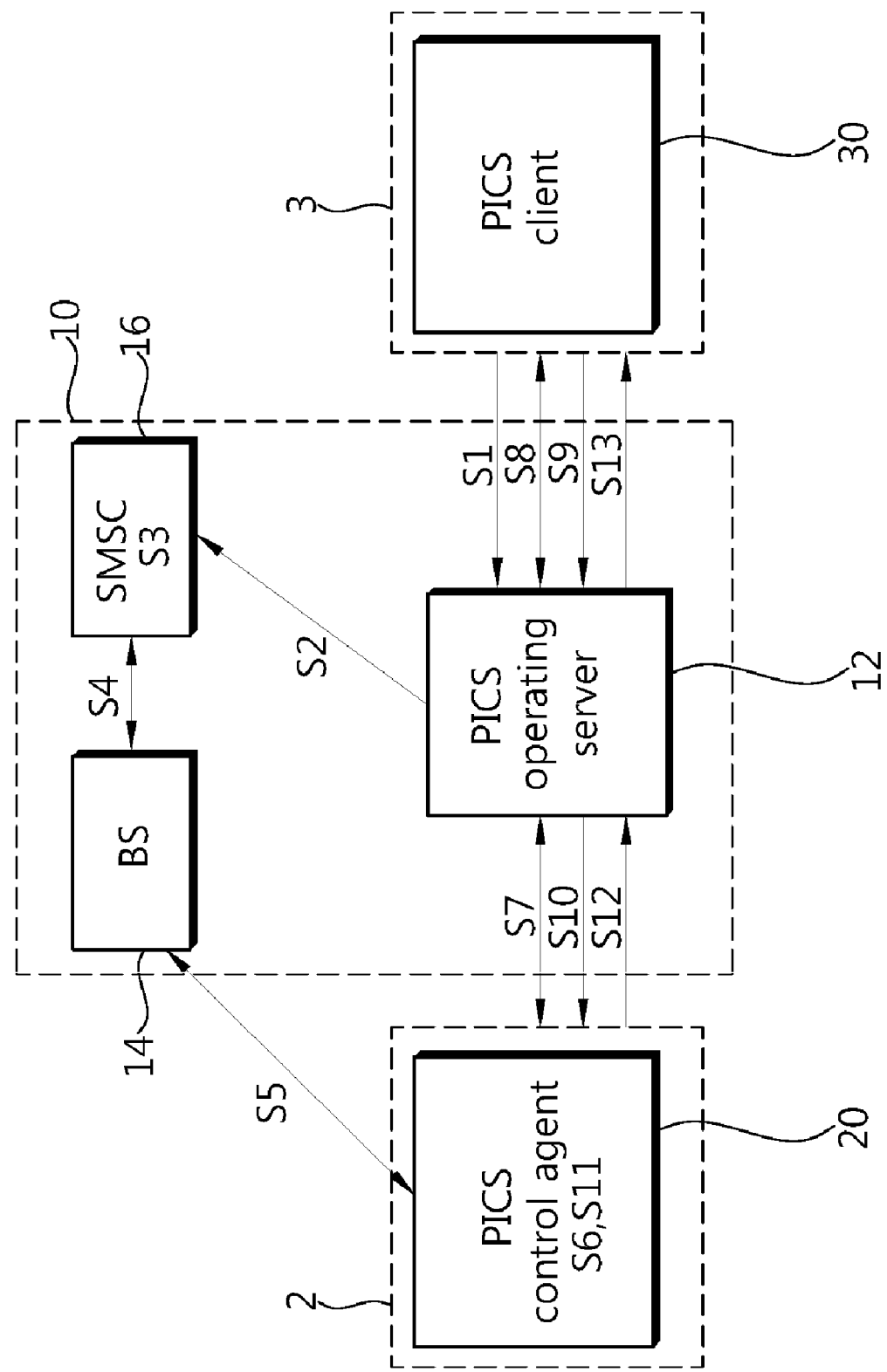
FIG. 2 illustrates a PICS providing procedure according to a first embodiment of the present invention.

FIG. 2 illustrates a PICS providing procedure according to a first embodiment of the present invention.

With reference to FIG. 2, when the user has lost his mobile communication terminal 2, he may access the PICS operating server 12 by using the PICS client 30 installed in the client terminal 3. At this time, the PICS operating server 12 may provide a service Web page having a certain user interface. The user may register the loss of the user mobile communication terminal 2 via the user interface provided by the service Web page. Then, the PICS client 30 transmits a loss registration control command to the PICS operating server 12 via the TCP/IP communication network (S1).

The PICS operating server 12 receives the loss registration control command and transfers it to the SMSC 16 (S2). In response to the transferred loss registration control command, the SMSC 16 configures a loss notification control message, a PICS message informing about the loss, in the form of SMS message (S3). The loss notification control message may include identification information indicating that the loss notification control message is a PICS control message and information indicating that the user mobile communication terminal 2 has been lost.

In this case, the SMSC 16 may configure a first form of loss notification control message or a second form of loss notification control message. The first form may refer to insertion of identification information identifying the PICS control message into a TID (Teleservice ID) field of an SMS transport layer. The second form may refer to insertion of identification information identifying the PICS control message together with data into a data field of an SMS teleservice layer.

Figure 3:
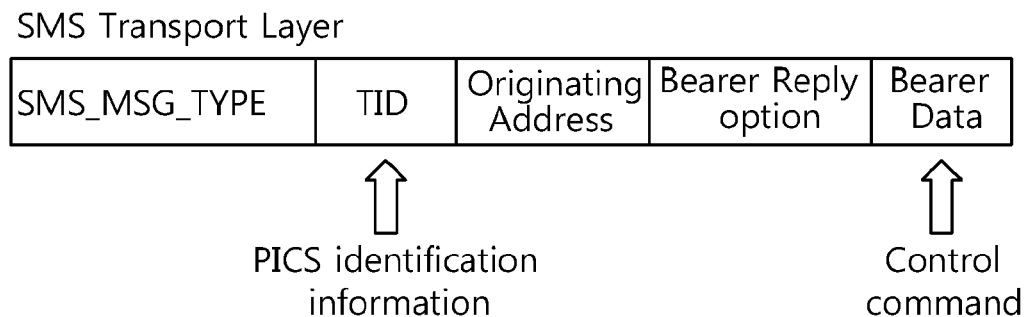
FIG. 3 illustrates a field configuration of a PICS control message configured based on a first form.

FIG. 3 illustrates a field configuration of a PICS control message configured based on the first form.

As shown in FIG. 3, the SMSC 16 may configure the PICS control message by utilizing particular fields of the SMS transport layer. For example, the SMSC 16 may insert information for identifying that a corresponding SMS message is a PICS control message into the TID field by which a type of a teleservice can be identified. In addition, the SMSC 16 may insert a control command (e.g., the loss registration control command in case of the loss notification message, and the operation control command in case of the operation control message) in a predetermined format into a data field, i.e., a 'Bearer Data' field.

Figure 4:
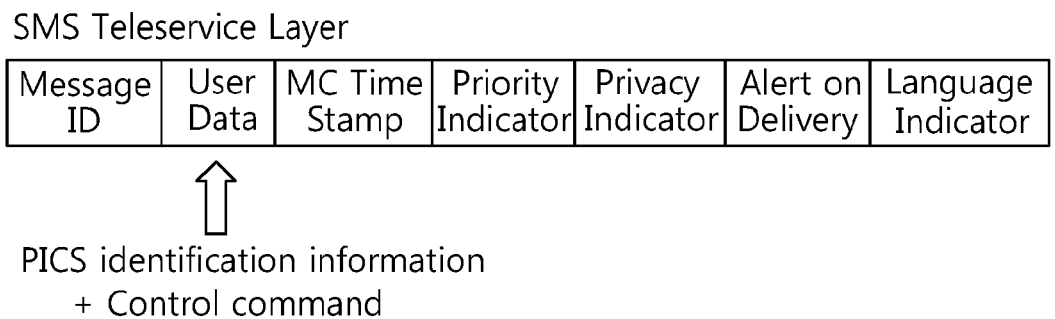
FIG. 4 illustrates a field configuration of a PICS control message configured based on a second form.

FIG. 4 illustrates a field configuration of a PICS control message configured based on the second form.

As shown in FIG. 4, the SMSC 16 may configure a PICS control message by using a particular field of the SMS teleservice layer. For example, the SMSC 16 may insert identification information indicating that a corresponding message is the PICS control message and a particular form of control command into a 'User Data' field, a data field, of the SMS teleservice layer. In this case, a hexa value indicating that the corresponding message is the PICS control message may be inserted into a front portion of the data field, and a predetermined form of control command may be inserted into a rear portion of the data field.

After configuring the loss notification control message corresponding to the first form or the second form, the SMSC 16 transmits it to the BS 14 (S4). Then, the BS 14 transmits the received loss notification control message to the user mobile communication terminal 2 (S5). The PICS control agent 20 of the user mobile communication terminal 2 activates the service function in response to the loss notification control message (S6).

In this case, if the loss notification control message has been configured in the first form of PICS control message, the PICS control agent 20 identifies the corresponding SMS message as the PICS control message with reference to the TID included in the loss notification control message and reads the loss notification control command included in the data field to recognize that the user mobile communication terminal 2 has been lost. Meanwhile, if the loss notification control message has been configured in the second form of PICS control message, the PICS control agent 20 may check the particular information, e.g., the hexa value, inserted at the front portion of the data field to identify the corresponding SMS message as the PICS control message.

Thereafter, the PICS control agent 20 is connected with the PICS operating server 12 via radio TCP/IP communication (S7). Also, the PICS operating server 12 and the PICS client 30 are connected via TCP/IP communication (S8).

When the connections are completed, the user may request various service operations to protect personal information stored in the user mobile communication terminal 2 and induce recovering of the lost user mobile communication terminal 2 through the PICS client 30. Accordingly, the PICS client 30 transmits a corresponding operation control command to the PICS operating server 12 (S9), and the PICS operating server 12 configures a control message including a predetermined form of control command word corresponding to the received control command and transmits the same to the PCIS control agent 20 (S10). Then, the PICS control agent 20 controls the operation of the user mobile communication terminal 2 according to content instructed by the control command word (S11).

Figure 5:
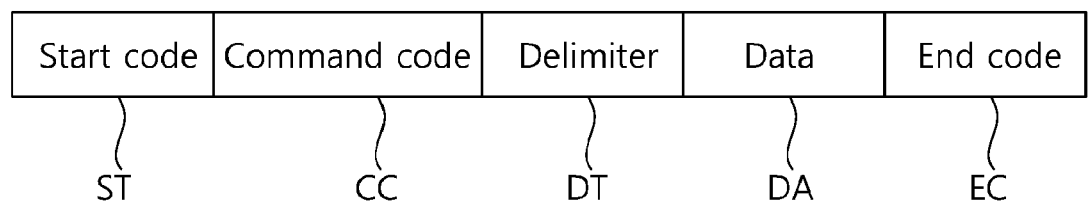
FIG. 5 illustrates the format of a control command used in a PICS.

FIG. 5 illustrates the form of a control command word used in the PICS. The illustrated control command word may be used for a control command via TCP/IP communication or inserted into a data field of the PICS control message.

As shown in FIG. 5, the control command word may include a start code (ST) field, a command word code (CC) field, a delimiter (DT) field, a data (DA) field, an end code (EC) field, and the like.

A code identifying a start of a control command word is inserted into the start code (ST) field. A command word code indicating a type of a control command word is inserted into the command word code (CC) field. A code value determined for discriminating a command word code and data is inserted into the delimiter (DT) field. Actual control information corresponding to a command word code is inserted into the data (DA) field. A determined code value indicating termination of a control command word is inserted into the end code (EC) field.

The PICS control agent 20 may control the user mobile communication terminal 2 in various manners upon receiving the control command word. For example, if the command word code is '0X01', a code value for setting a phone number to contact, and data is '3000300300', the PICS control agent 20 may be connected to a phone number corresponding to the data or display a message asking a user to contact with the phone number.

After controlling the operation of the user mobile communication terminal 2, the PICS control agent 20 control agent 20 may transmit control result information to the PICS operating server 12 by using TCP/IP communication (S12). The PICS operating server 12 may transfer the received control result information to the PICS client 30 (S13). Then, the PICS client 30 may inform the user about the control result.

As described above, in the first embodiment of the present invention, if the user mobile communication terminal 2 is lost, the service function of the PICS control agent 20 is activated via the SMS mobile communication network and the operation of the user mobile communication terminal 2 is controlled through TCP/IP communication.

Meanwhile, without using TCP/IP communication, the service function of the PICS control agent 20 may be activated via the SMS mobile communication network and the operation of the user mobile communication terminal 2 may be controlled. This will be described according to a second embodiment of the present invention as follows.

<Second Embodiment of PICS Providing Procedure>

Figure 6:
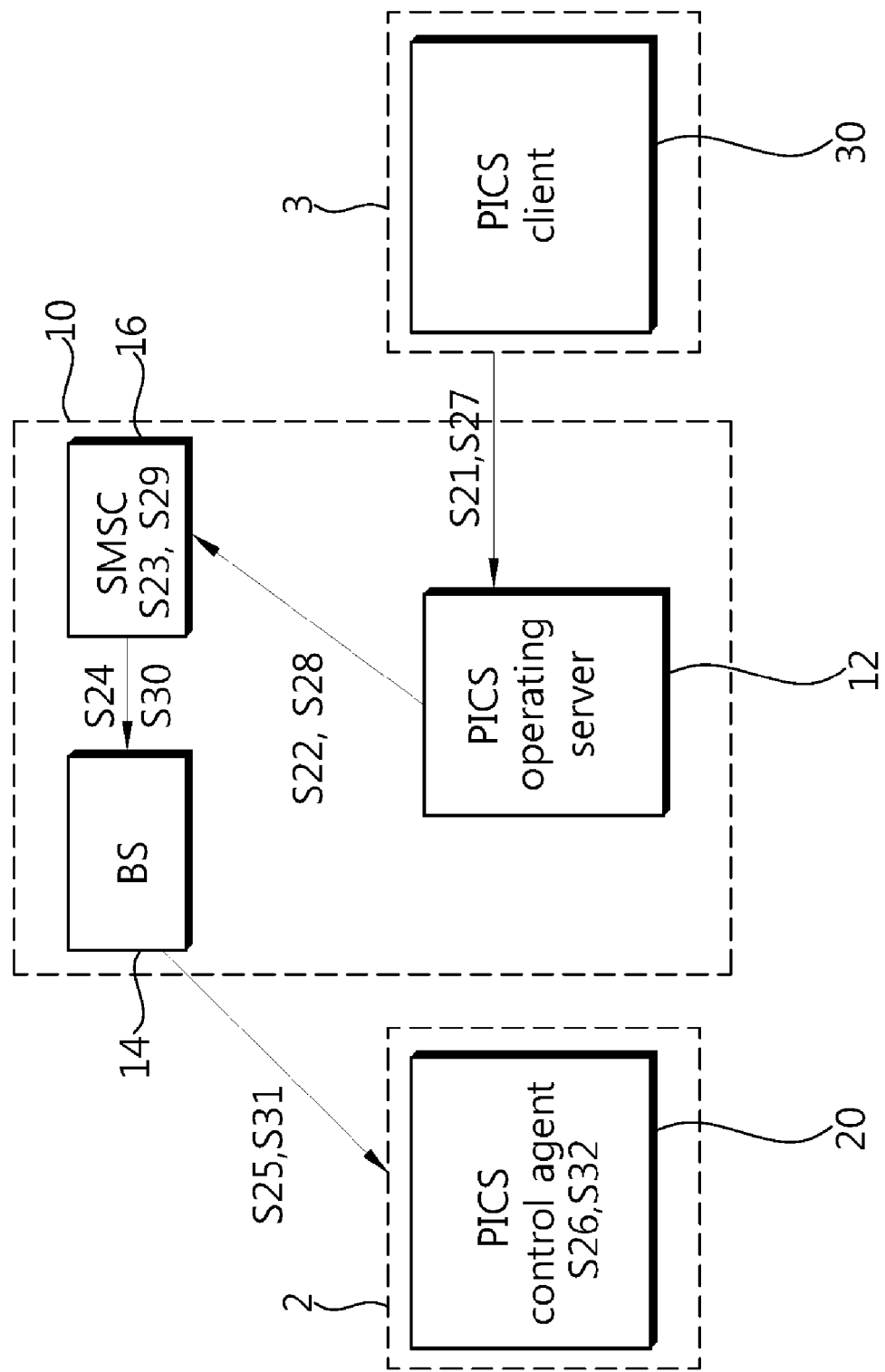
FIG. 6 illustrates a PICS providing procedure according to a second embodiment of the present invention.

FIG. 6 illustrates a PICS providing procedure according to a second embodiment of the present invention.

With reference to FIG. 6, when the user has lost his mobile communication terminal 2, the user may access the PICS operating server 12 by using the PICS client 30 installed in the client terminal 3. At this time, the PICS operating server 12 may provide a service Web page having a certain user interface, and the user may register the loss of the user mobile communication terminal 2 via the user interface provided by the service Web page. Then, the PICS client 30 transmits a loss registration control command to the PICS operating server 12 via the TCP/IP communication network (S21).

Upon receiving the loss registration control command, the PICS operating server 12 transfers the loss registration control command to the SMSC 16 (S22). In response to the transferred loss registration control command, the SMSC 16 configures a loss notification control message, a PICS message informing about the loss, in the form of SMS message (S23). The loss notification control message may include identification information indicating that the loss notification control message is a PICS control message and information indicating that the user mobile communication terminal 2 has been lost. The loss notification control message may be configured in the first form or the second form as mentioned above.

Next, the SMSC 16 transmits the configured loss notification control message to the BS 14 (S24). Then, the BS 14 transmits the transferred loss notification control message to the PICS control agent 20 of the user mobile communication terminal 2 (S25). In response to the loss notification control message, the PICS control agent 20 activates the service function and changes the user mobile communication terminal 2 into a loss state (S26). In this case, as stated above, if the loss notification control message has been configured in the first form of PICS control message, the PICS control agent 20 identifies the corresponding SMS message as the PICS control message with reference to a TID included in the loss notification control message and reads content included in the data field to recognize that the user mobile communication terminal 2 has been lost. Meanwhile, if the loss notification control message has been configured in the second form of PICS control message, the PICS control agent 20 may check particular information, e.g., a hexa value, inserted at a front portion of the data field to identify the corresponding SMS message as the PICS control message.

Subsequently, the user may input a desired operation control request to the PICS client 30 in order to protect his personal information. Then, the PICS client 30 transmits an operation control command to the PICS operating server 12 via the TCP/IP communication network (S27).

Upon receiving the operation control command, the PICS operating server 12 transfers it to the SMSC 16 (S28). In response to the transferred operation control command, the SMSC 16 configures an operation control message, a PICS message instructing controlling of an operation for a service function, in the form of SMS message (S29). The operation control message may include identification information indicating that the corresponding message is a PICS control message and information instructing a controlling operation related to the requested service. The operation control message may be configured in the first form or the second form.

The SMSC 16 transmits the configured operation control message to the BS 14 (S30). Then, the BS 14 transmits the transferred operation control message to the PICS control agent 20 of the user mobile communication terminal 2 (S31). The PICS control agent 20 controls the operation of the user mobile communication terminal 2 according to the operation control message (S32).

In this case, if the operation control message has been configured in the first form of PICS control message, the PICS control agent 20 identifies the corresponding SMS message as the PICS message with reference to the TID included in the operation control message and reads content included in a data field to recognize (or determine) how to control the user mobile communication terminal 2. Meanwhile, if the operation control message has been configured in the second form of PICS control message, the PICS control agent 20 may identify the corresponding SMS message as the PICS message by checking the particular information, e.g., the hexa value, inserted at the front portion of the data field.

The cases of providing services by using the SMS system and TCP/IP communication when the user mobile communication terminal 2 is lost have been described in the first and second embodiments of the present invention.

Meanwhile, in the present invention, when the user mobile communication terminal 2 is lost, the PICS control message may be also transmitted by using a paging channel or a traffic channel of a mobile communication signal. Hereinafter, examples of providing a service by using a paging channel or a traffic channel of a mobile communication signal will now be described.

<Third Embodiment of PICS Providing Procedure>

Figure 7:
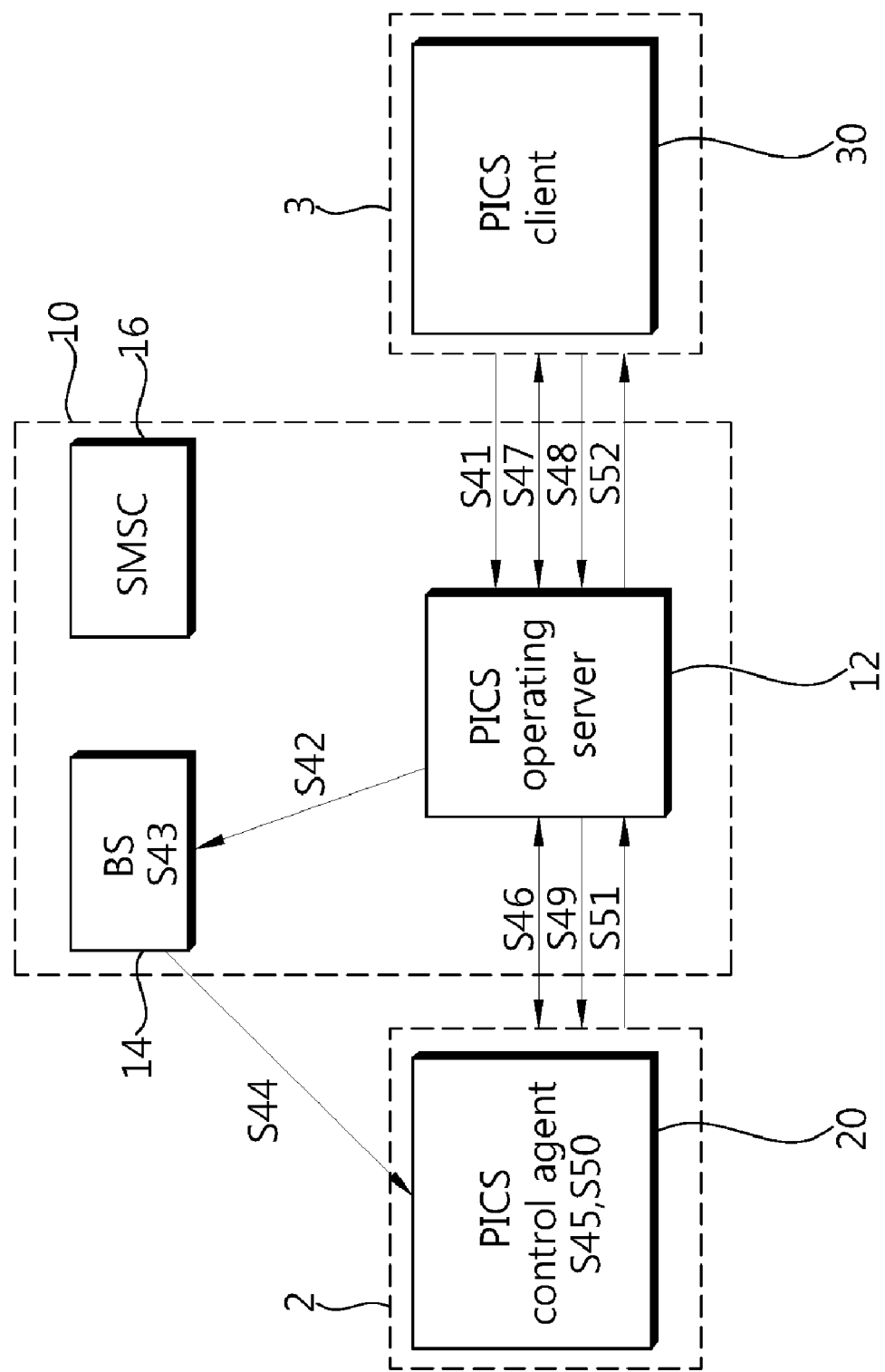
FIG. 7 illustrates a PICS providing procedure according to a third embodiment of the present invention.

FIG. 7 illustrates a PICS providing procedure according to a third embodiment of the present invention.

With reference to FIG. 7, first, as mentioned above, when the user has lost his mobile communication terminal 2, the user may access the PICS operating server 12 by using the PICS client 30 installed in the client terminal 3. At this time, the PICS operating server 12 may provide a service Web page having a certain user interface. The user may register the loss of the user mobile communication terminal 2 via the user interface provided by the service Web page. Then, the PICS client 30 transmits a loss registration control command to the PICS operating server 12 via the TCP/IP communication network (S41).

The PICS operating server 12 receives the loss registration control command and transfers it to the BS 14 (S42). In response to the transferred loss registration control command, the BS 14 configures a loss notification control message, a PICS message informing about the loss, in the form of paging channel message or traffic channel message (S43). The loss notification control message may include identification information indicating that the loss notification control message is a PICS control message and information indicating that the user mobile communication terminal 2 has been lost.

Figure 8:
FIG. 8 illustrates a field of a PICS control message configured by a base station (when a paging channel is used).

FIG. 8 illustrates a field configuration of the PICS control message configured by the BS 14 when a paging channel is used.

As shown in FIG. 8, the BS 14 may configure the PICS control message by using a paging channel message. For example, the BS 14 may insert identification information indicating that a corresponding message is a PICS message and a determined form of control command word into a message body field of a directed message of a paging channel message. For example, The BS 14 may insert a particular form of value indicating a loss registration or operation controlling as a burst type value into a data burst message.

Figure 9:
FIG. 9 illustrates a field of a PICS control message configured by a base station (when a traffic channel is used).

FIG. 9 illustrates a field configuration of a PICS control message configured by the BS 14 when a traffic channel is used.

As shown in FIG. 9, the BS 14 may configure a PICS control message by utilizing a traffic channel message. For example, the BS 14 may insert particular information indicating a loss registration or operation controlling into a secondary traffic field (88 bits) of a forward message on a traffic channel. A voice signal is mainly inserted into a primary traffic field (80 bits), so the secondary traffic field is preferably used for the particular information, but the present invention is not limited thereto and PICS information may be inputted into the primary traffic field according to embodiments.

After the BS configures a loss notification control message in such manner, it transmits the loss notification control message to the PICS control agent 20 of the user mobile communication terminal 2 (S44). In response to the loss notification control message, namely, the paging channel message or the traffic channel message, the PICS control agent 20 activates a service function (S45).

Thereafter, the PICS control agent 20 is connected to the PICS operating server 12 through TCP/IP communication (S46). In addition, the PICS operating server 12 and the PICS client 30 are also connected through TCP/IP communication (S47). When the connections are completed, the user may request various service operations to protect personal information stored in the user mobile communication terminal 2 and induce recovering of the lost user mobile communication terminal 2 through the PICS client 30. Accordingly, the PICS client 30 transmits a corresponding operation control command to the PICS operating server 12 (S48), and the PICS operating server 12 configures a determined form of control command word corresponding to the received control command according to TCP/IP communication and transmits the same to the PICS control agent 20 (S49). Then, the PICS control agent 20 controls the operation of the user mobile communication terminal 2 according to content instructed by the control command word (S50).

After controlling the operation of the user mobile communication terminal 2, the PICS control agent 20 may transmit corresponding control result information to the PCIS operating server 12 by using TCP/IP communication (S51). The PICS operating server 12 may transfer the received control result information to the PICS client 30 (S52). Then, the PICS client 30 may inform the user about the control result.

In the third embodiment of the present invention, the case where when the user mobile communication terminal 2 is lost, the service function of the PICS agent 20 is driven through a particular channel (i.e., the paging channel or the traffic channel) of a mobile communication signal and the operation of the user mobile communication terminal 2 is controlled through TCP/IP communication has been described.

Meanwhile, in the present invention, when the user mobile communication terminal 2 is lost, activating of the service function of the PICS control agent 20 and controlling of the operation of the user mobile communication terminal 2 can be performed by using a paging channel message or a traffic channel message. This will be described according to a fourth embodiment of the present invention.

<Fourth Embodiment of PICS Providing Procedure>

Figure 10:
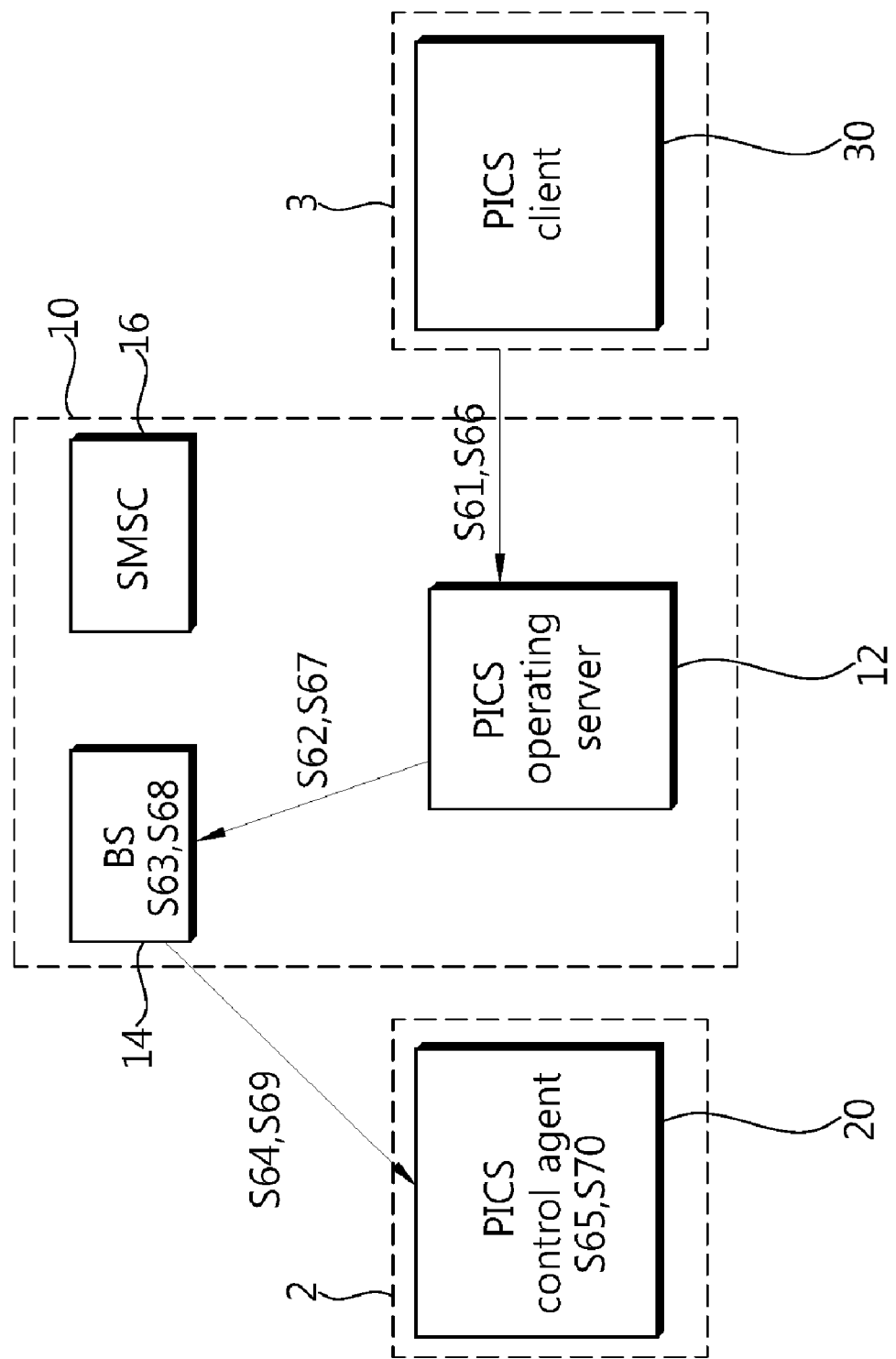
FIG. 10 illustrates a PICS providing procedure according to a fourth embodiment of the present invention.

FIG. 10 illustrates a PICS providing procedure according to a fourth embodiment of the present invention.

With reference to FIG. 10, when the user has lost his mobile communication terminal 2, he may access the PICS operating server 12 by using the PICS client 30 installed in the client terminal 3. At this time, the PICS operating server 12 may provide a service Web page having a certain user interface, and the user may register the loss of the user mobile communication terminal 2 via the user interface provided by the service Web page. Then, the PICS client 30 transmits a loss registration control command to the PICS operating server 12 via the TCP/IP communication network (S61).

The PICS operating server 12 receives the loss registration control command and transfers it to the BS 14 (S62). In response to the transferred loss registration control command, the BS 14 configures a loss notification control message, a PICS message informing about the loss, in the form of paging channel message or traffic channel message (S63). The loss notification control message may include identification information indicating that the loss notification control message is a PICS control message and information indicating that the user mobile communication terminal 2 has been lost.

Next, the BS 14 transmits the configured loss notification control message to the user mobile communication terminal 2 (S64). In response to the loss notification control message, the PICS control agent 20 of the user mobile communication terminal 2 activates a service function (S65).

Subsequently, the user may input a desired operation control request to the PICS client 30 in order to protect his personal information. Then, the PICS client 30 transmits an operation control command to the PICS operating server 12 via the TCP/IP communication network (S66).

Upon receiving the operation control command, the PICS operating server 12 transfers it to the BS 14 (S67). In response to the transferred operation control command, the BS 14 configures an operation control message, a PICS message instructing controlling of a corresponding operation, in the form of a paging channel message or a traffic channel message (S68). The operation control message may include identification information indicating that the corresponding message is a PICS control message and information instructing a controlling operation for a particular service function (which is, for example, previously set or requested by the user).

Subsequently, the BS 14 transmits the configured operation control message to the PICS control agent 20 of the user mobile communication terminal 2 (S69). Then, the PICS control agent 20 of the user mobile communication terminal 2 controls the operation of the user mobile communication terminal 2 according to the operation control message (S70).

In the first to fourth embodiments of the present invention, the case where when the user mobile communication terminal 2 is lost, the corresponding mobile communication terminal is controlled by using a particular form of message has been described. Meanwhile, in the present invention, when the user mobile communication terminal 2 has lost, the user mobile communication terminal 2 can be controlled by originating a call to the user mobile communication terminal 2 by using a particular origination number. Controlling of the user mobile communication terminal 2 by originating a call using a particular origination number will now be described.

<Fifth Embodiment of PICS Providing Procedure>

Figure 11:
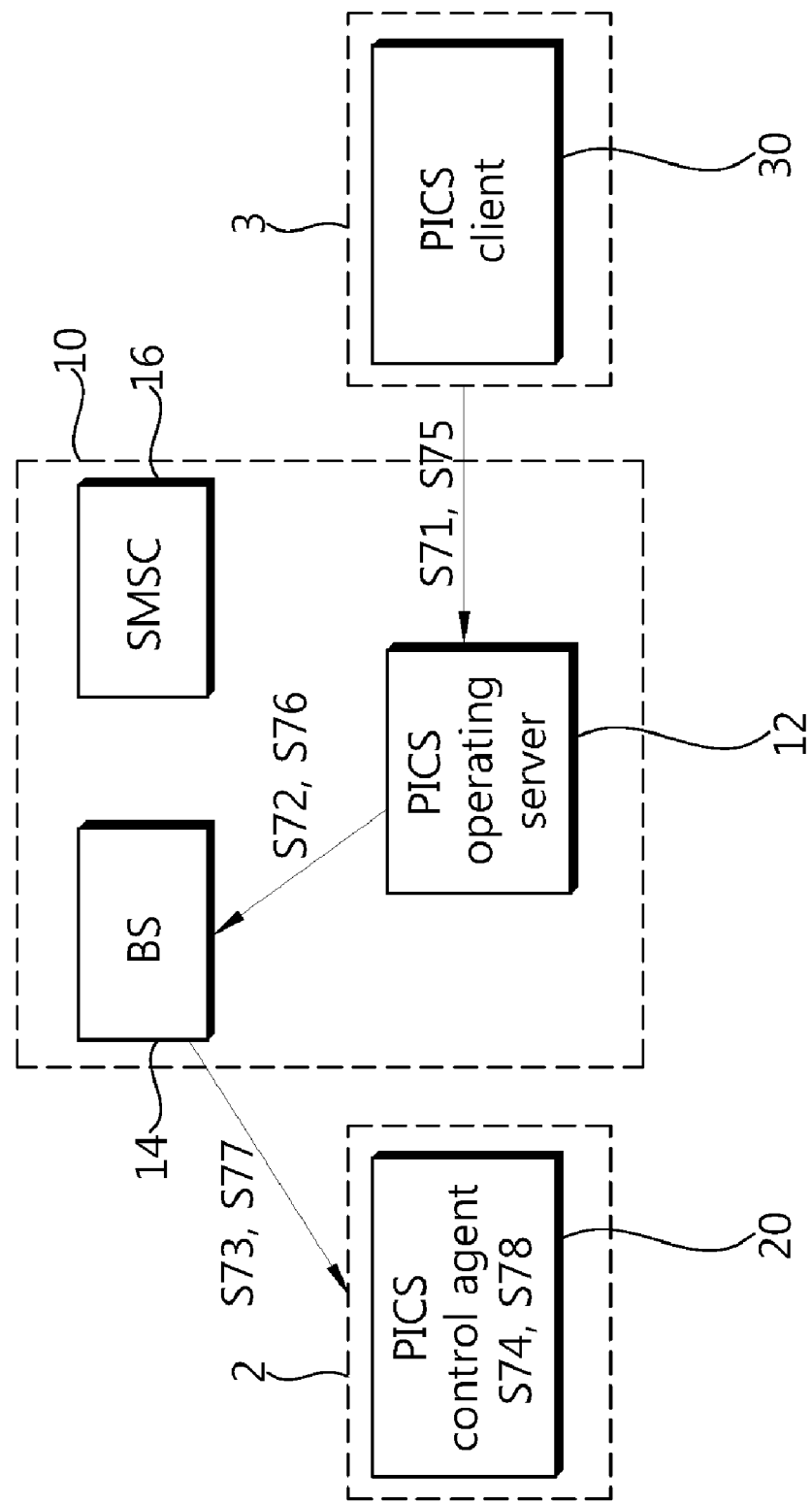
FIG. 11 illustrates a PICS providing procedure according to a fifth embodiment of the present invention.

FIG. 11 illustrates a PICS providing procedure according to a fifth embodiment of the present invention.

With reference to FIG. 11, when the user has lost his mobile communication terminal 2, he may access the PICS operating server 12 by using the PICS client 30 installed in the client terminal 3. At this time, the PICS operating server 12 may provide a service Web page having a certain user interface, and the user may register the loss of the user mobile communication terminal 2 via the user interface provided by the service Web page. Then, the PICS client 30 transmits a loss registration control command to the PICS operating server 12 via the TCP/IP communication network (S71).

Upon receiving the loss registration control command, the PICS operating server 12 originates a call by using a pre-set particular origination number, e.g., an activation origination number (S72). To this end, the PICS operating server 12 may include an Internet phone with the activation origination number allocated thereto. The activation origination number may be an Internet phone number such as, for example, '070-1234-1234', and the like.

The PICS operating server 12 may generate a call by adding a number arrangement of certain ciphered (i.e., encoded or coded) digits (e.g., 4 digits) to the origination number. For example, the PICS operating server 12 may use '070-1234-1234-XXXX (ciphered number arrangement)' as the activation origination number. The ciphered portion may be used as information for determining whether the origination number has been properly transmitted from the PICS operating server, for example, as authentication information and the like.

The activation origination number, a key used for ciphering, an algorithm for deciphering the ciphered information, origination information of the ciphered number arrangement, and the like, are information previously agreed with the PICS control agent 20 and stored in the PICS control agent 20. For example, the PICS control agent stores and manages the PICS origination number, a PICS origination number table including control content corresponding to the PICS origination number, the key for deciphering ciphered information added to the PICS origination number, the deciphering algorithm, the origination information of the ciphered number arrangement, and the like. As the key used for ciphering (encoding) and deciphering (decoding), a one-time password (OTP) may be used in terms of security.

The BS 14 calls the mobile communication terminal 2 via the mobile communication network according to the call generated by the PICS operating server 12 (S73). When the call is received by the mobile communication terminal 2, the PICS control agent 20 analyzes the origination number of the call to recognize the origination number as the activation origination number, and activates the service function of the PICS control agent 20 (S74). For example, the PICS control agent 20 may check the origination number of the received call from the PICS origination number table storing the origination number to determine whether or not the origination number of the received call is the PICS-related origination number, and find out whether or not the origination number of the call is the activation origination number of PICS-related origination number.

Meanwhile, if the origination number of the call includes a ciphered number arrangement, the PICS control agent 20 may decipher the ciphered origination number by using the previously stored key and deciphering algorithm and compares the deciphered content with the previously stored origination information to determine whether or not the origination number is a proper origination number. In this case, if the origination number of the received call is the PICS-related origination number, if the deciphered content is different from the origination information, the PCIS control agent 20 may determine that the received call is not a normal one and terminate the procedure.

When the service function of the PICS control agent 20 is activated, the user may request various service operations to protect personal information stored in the user mobile communication terminal 2 and induce recovering of the lost user mobile communication terminal 2 through the PICS client 30. Accordingly, the PICS client 30 transmits a corresponding operation control command to the PICS operating server 12 (S75), and the PICS operating server 12 generates a call to the user mobile communication terminal 2 by using a particular origination number corresponding to the received operation control command, e.g., an operation control origination number by which the PICS control agent 20 can identify a corresponding operation (S76). The BS 14 pages the user mobile communication terminal 2 according to the generated call (S77).

When the call is received by the user mobile communication terminal 2, the PICS control agent 20 may analyze the origination number of the received call to recognize content of the corresponding operation controlling and perform operation controlling (S78). For example, the PICS control agent 20 may check the origination number of the received call from the PICS origination number table storing the origination number to recognize whether the origination number of the call is the operation control origination number, determine which operation it should perform, and control the user mobile communication terminal 2.

<Sixth Embodiment>

In the first to fifth embodiments of the present invention, the cases where when the user mobile communication terminal 2 has been lost, the user mobile communication terminal 2 is controlled by a particular control message or a call using a particular origination number have been described. In the embodiments, the PICS providing procedure may be divided into the process of activating the service function of the PICS control agent 20 provided in the user mobile communication terminal 2 and the process of remotely controlling the PICS control agent in a state that the service function of the PICS control agent is activated.

The activating process and the controlling process may be variably combined to be implemented without being limited to the embodiments as described. For example, after a call is originated to the user mobile communication terminal 2 by using the particular origination number to activate the service function of the PICS control agent 20 likewise as in the fifth embodiment, the functions of the PICS control agent 20 may be controlled by using the particular form of message as in the first, second, third, or fourth embodiment. Conversely, after the PICS control agent 20 is activated by using the particular form of message, the functions of the PICS control agent 20 may be controlled by using the particular origination number.

Embodiments of various scenarios in which the control message is transferred to the PICS control agent 20 of the user mobile communication terminal 2 in the PICS have been described. When the service functions of the PICS control agent 20 provided in the user mobile communication terminal 2 are activated, various services functions may be performed to protect personal information. The configuration, service functions and operation of the PICS control agent 20 will now be described in detail.

Figure 12:
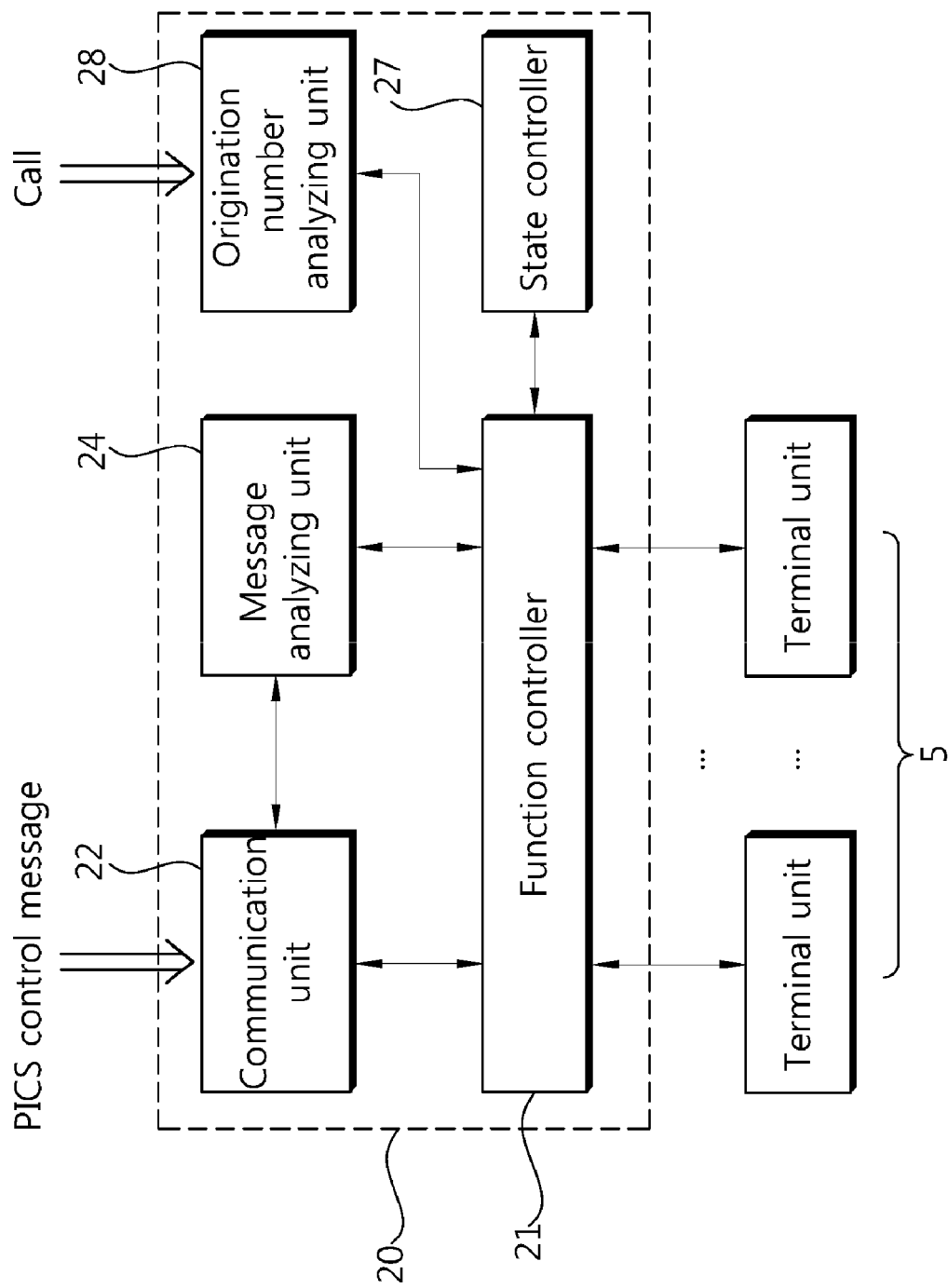
FIG. 12 is a schematic block diagram showing the configuration of a PICS control agent according to an exemplary embodiment of the present invention.

FIG. 12 is a schematic block diagram showing the configuration of the PICS control agent 20 according to an exemplary embodiment of the present invention.

As shown in FIG. 12, the PICS control agent 20 may include a communication unit 22, a message analyzing unit 24, an origination number analyzing unit 28, a state controller 27, and a function controller 21.

The communication unit 22 may serve to transmit information to an external network and receive information transmitted from an external source. The communication unit 22 may receive the PICS control message, e.g., the SMS message, the paging channel message, and the traffic channel message transmitted from the BS 14 via the mobile communication network, or the PICS control message received from the PICS operating server via radio TCP/IP communication, and transmit the same to the message analyzing unit 24. In addition, the communication unit 22 may transmit information (e.g., control result-related information and the like) transferred from the function controller 21, the state controller 27, or the like, to the PICS operating server 12 via radio TCP/IP communication.

The message analyzing unit 24 may analyzes the message transferred from the communication unit 22 to determine whether or not it is a control message related to the PICS. If the received message is the PICS control message, the message analyzing unit 24 analyzes its content and provides corresponding information to the function controller 21 or the state controller 27. For example, if the message received via the communication unit 22 is an SMS message configured in the first form, the message analyzing unit 24 checks a TID of the corresponding SMS message to determine whether it is a PICS control message. If the SMS message is a PICS control message, the message analyzing unit 24 may deliver content of a control command word inserted in a data field of the message to the function controller 21 or the state controller 27. Also, if the message received via the communication unit 22 is an SMS message configured in the second form, the message analyzing unit 24 may parse content of the corresponding SMS message to determine whether or not it is a PICS control message. If the SMS message is a PICS control message, the message analyzing unit 24 may provide content of a control command word of the message to the function controller 21 or the state controller 27. In case where the message received via the communication unit 22 is a paging channel message, a traffic channel message, or a TCP/IP communication message, the corresponding message may be processed in the same manner. Which type of message is used as a PICS message in the PICS system may be optional according to embodiments.

The origination number analyzing unit 28 analyzes an origination number of a call received by the mobile communication terminal 2 to determine whether or not the number of the call is an origination number related to the PICS. If the number is an origination number related to the PICS, the origination number analyzing unit 28 extracts corresponding control content and transmits the same to the state controller 27 or the function controller 21. For example, the origination number analyzing unit 28 analyzes the origination number of the call received by the mobile communication terminal 2 to determine whether or not the origination number of the received call is a previously stored activation origination number. If the origination number of the received call is the activation origination number, the origination number analyzing unit 28 may transmit a loss notification command to the state controller 27. Alternatively, the origination number analyzing unit 28 analyzes the origination number of the call received by the mobile communication terminal 2 to determine whether or not the origination number of the received call is a previously stored operation control origination number. If the origination number of the received call is an origination number for controlling a particular operation, the origination number analyzing unit 28 may transmit a control command requesting the corresponding operation to the function controller 21. Meanwhile, if the origination number includes additional ciphered information, the origination number analyzing unit 28 may perform a deciphering function.

The origination number analyzing unit 28 may store and manage the PICS origination number, a PICS origination number table including control content corresponding to the PICS origination number, a key for deciphering the ciphered information added to the PICS origination number, a deciphering algorithm, the origination information of the ciphered number arrangement, and the like.

If content of the control command provided from the message analyzing unit 24 or the origination number analyzing unit 28 is a command related to a loss notification, the state controller 27 changes the state of the PICS control agent 20. The PICS control agent 20 is in a sleep state when the user mobile communication terminal 2 is in a normal state. In the sleep state, only the communication unit 22, the message analyzing unit 24, and the state controller 27 may perform a basic operation and the service functions may not be activated. Meanwhile, when the user mobile communication terminal 2 is lost, the PICS control agent 20 is activated. In the active state, the function controller 21 is operated to activate the service functions of the PICS control agent 20. With the service functions activated, terminal controlling is performed to perform a corresponding service function according to a control command word or a particular origination number received from an external source (e.g., the BS, the PICS operating server, and the like). Namely, the active state may refer to a state in which the PICS control agent 20 is substantially driven to put the user mobile communication terminal 2 under its control and control the operation of the user mobile communication.

When the loss notification command is received from the message analyzing unit 24 of the origination number analyzing unit 28, the state controller 27 drives the function controller 21 to activate the service functions of the PICS control agent 20. At this time, the PICS control agent 20 is activated and the user mobile communication terminal 2 transitions to a loss state. Meanwhile, when a loss release command (which is, for example, is transmitted as a PICS control message to the user mobile communication terminal 2) is received from the message analyzing unit 24, or when there is a corresponding request from the origination number analyzing unit 28, the state controller 27 terminates the operation of the function controller 21 immediately or within a pre-set time. At this time, the PICS control agent 20 turns to a sleep state and the user mobile communication terminal 2 becomes normal.

The function controller 21 controls the lost user mobile communication terminal 2 by controlling a corresponding terminal unit 5 of the user mobile communication terminal 2 according to content of a control command word provided from the message analyzing unit 24 or content of a control command transmitted from the origination number analyzing unit 28. Namely, the function controller 21 performs a control command requested by the PICS client 30. The function controller 21 is driven or terminated under the control of the state controller 27 as mentioned above.

The PICS control agent 20 may provide the following service functions according to content of the PICS operation control message (or control content discriminated by the PICS origination number).

1. Locking function: The user mobile communication terminal 2 is changed into a locked state to prevent a leakage of personal information. In the locked state, a menu entering is prevented and the use of particular functions is limited.

2. Ciphering key deleting/concealing function: A ciphering key for deciphering data is deleted or concealed to protect personal information. Various types of data (e.g., phone numbers, memo, schedules, certificates, etc.), namely, the security subjects, are ciphered with a common ciphering key and kept in storage and the ciphering key is also separately kept in storage, and in the occurrence of a loss of the mobile communication terminal, the ciphering key is backup to the PICS operating server via a network and the ciphering key is then deleted/concealed from the user mobile communication terminal, whereby a person who comes across or picks up the lost mobile communication terminal cannot view the ciphered data, to thus attain the effect of data protection.

3. Data management function: Data stored in the user mobile communication terminal 2 is backup, deleted and recovered. For example, the data stored in the user mobile communication terminal 2 is uploaded to a particular network entity (e.g., the PICS operating server, etc.) to perform backup, and then, the data stored in the user mobile communication terminal 2 is deleted. When a loss state is released, the backup data is received from the network entity and stored in the user mobile communication terminal 2, recovering the data.

4. Location transmission function: Location information of the user mobile communication terminal 2 is requested from a GPS, the BS, and the like, and provided to the PICS operating server to inform about the location of the user mobile communication terminal 2.

5. Image information providing function: A camera of the user mobile communication terminal 2 is operated to capture current image information and provide the same to the PICS operating server 12. The PICS operating server may provide the same to the PICS client 30.

6. A voice information providing function: A microphone of the user mobile communication terminal 2 is operated to record current voice (audio) information and provide the same to the PICS operating server 12. The PICS operating server 12 may provide the same to the PICS client 30.

7. Updating function: A function module required for security is received from the PICS operating server 12 and installed in the user mobile communication terminal 2. The operation of the installed function module may be controlled.

8. Information output function: A predetermined message or a message set by the user (which, for example, may be set through the PICS client) is output via a display panel or a speaker of the user mobile communication terminal 2. For example, a message such as 'Contact number is 'XXX-XXXX', or 'You will be rewarded when you return it' may be displayed or output in an audible manner.

9. Call limiting function: Making a call by using the user mobile communication terminal 2 is prevented, or a call to a predetermined phone number or to a phone number set by the user is only allowed.

10. A loss releasing function: A loss state of the user mobile communication terminal 2 is released. When a control command word informing about a loss release or a predetermined user password is input, the PICS control agent 20 transitions to a sleep state immediately or within a pre-set time. Then, the user mobile communication terminal 2 is normally operated.

11. Forcible driving function: In a state that the loss state is not released, if power of the user mobile communication terminal 2 is turned off and soon turned on, the PICS control agent 20 forcibly maintains the active state. Namely, in the state that the service functions are activated, the user mobile communication terminal 2 can be controlled. To this end, the state controller 27 may store a value for recognizing that the PICS control agent 20 is driven in an active state, in a memory of the user mobile communication terminal 2.

12. Control result report function: The result of controlling operation to perform the service functions is reported to the PICS operating server 12. The reported control result is transmitted to the PICS client 30.

Meanwhile, although the loss notification control message is not received or although a call using the activation origination number is not received, the PICS control agent 20 may analyze specific identification information of the user mobile communication terminal 2 and specific identification information of a universal subscriber identity module (USIM) inserted in the user mobile communication terminal 2. When the user mobile communication terminal 2 is suspected to have been lost, the PICS control agent 20 may change the user mobile communication terminal 2 into a loss state and the PICS control agent 20 itself may transition to the active state to perform the above-described service functions.

The user mobile communication terminal 2 has an international mobile equipment identity (IMEI), specific identification information. The PICS control agent 20 ciphers and stores the IMEI value of the user mobile communication terminal 2 in a file system of the USIM inserted in the user mobile communication terminal 2. The USIM has an international mobile station identity (IMSI), specific identification information. The PICS control agent 20 may cipher and store the IMSI value of the USIM in the file system of the user mobile communication terminal 2. Storing of the IMEI or the IMSI values may come at a point of time when the PICS control agent 20 is installed at an early stage, but the present invention is not limited thereto. The state controller 27 of the PICS control agent 20 may store the IMSI and the IMEI and perform information comparing operation even in the sleep state.

Figure 13:
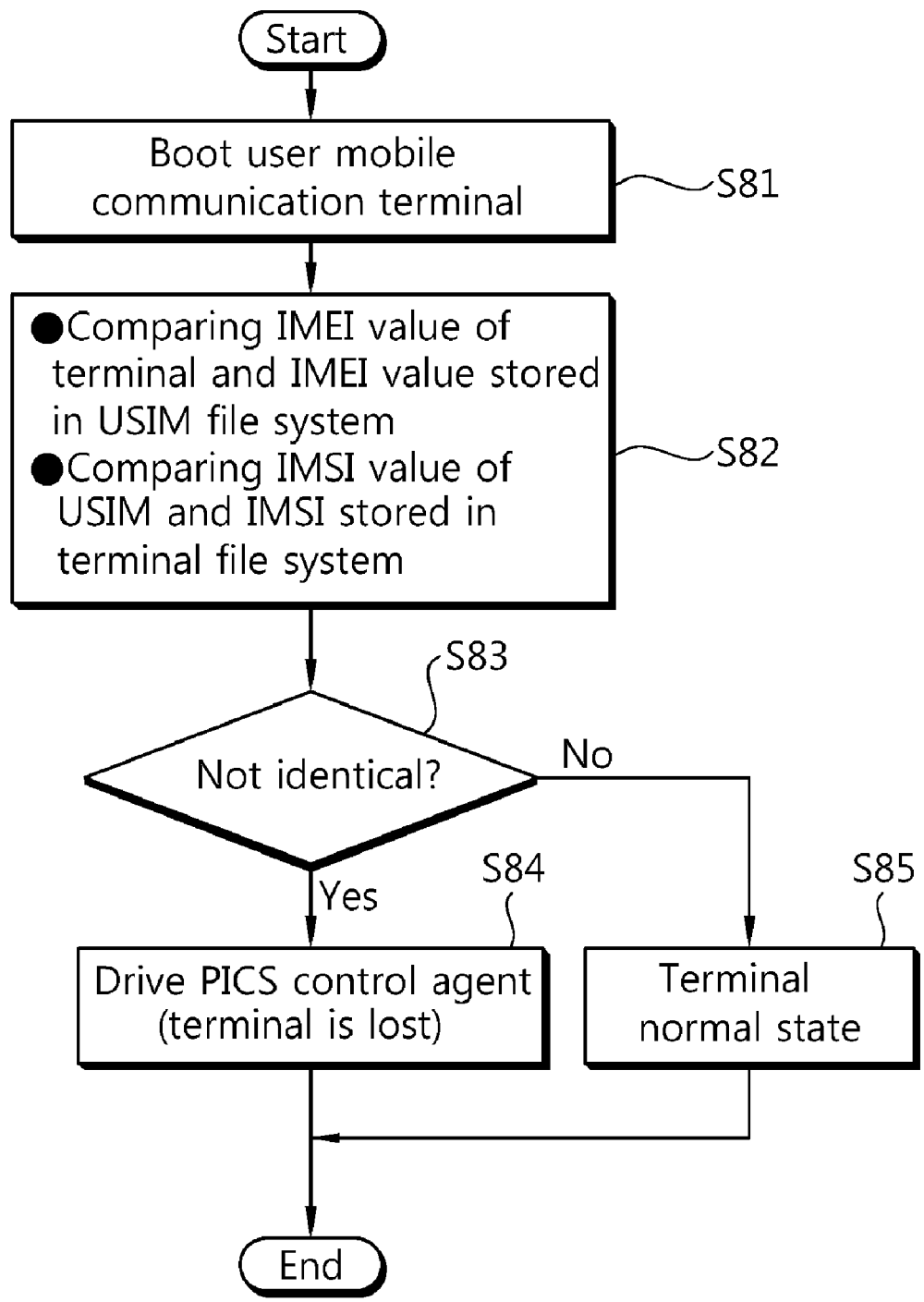
FIG. 13 is a flow chart illustrating an operation of the PICS control agent when a user mobile communication terminal in a normal state is booted.

FIG. 13 is a flow chart illustrating the operation of the PICS control agent 20 when the user mobile communication terminal in a normal state is booted.

As shown in FIG. 13, when the user mobile communication terminal 2 is booted (S81), the PICS control agent 20 compares the IMEI value stored in the file system of the USIM and that of the user mobile communication terminal 2, and the IMSI value stored in the user mobile communication terminal 2 and that of the USIM (S82).

If the IMEI value stored in the file system of the USIM and that of the user mobile communication terminal 2 are not identical or if the IMSI value stored in the user mobile communication terminal 2 and that of the USIM are not identical (S83), the PICS control agent 20 transitions to the active state to activate the service functions (S84). At this time, the user mobile communication terminal 2 transitions to a loss state. The service functions of the PICS control agent 20 are as described above.

If the IMEI value stored in the file system of the USIM and that of the user mobile communication terminal 2 are identical or if the IMSI value stored in the user mobile communication terminal 2 and that of the USIM are identical (S83), the PICS control agent 20 maintains the sleep state and the user mobile communication terminal 2 maintains the normal state. In this state, the user mobile communication terminal 2 can provide the normal mobile communication services.

Meanwhile, if the user mobile communication terminal 2 has been lost and a person who comes across or picks up the user mobile communication terminal 2 turns off power of the user mobile communication terminal 2 or moves to a service shadow area for the purpose of extracting data of the user mobile communication terminal 2 without authorization, the PICS operating system periodically transmits the loss notification message or the operation control message to the user mobile communication terminal 2 through an SMS or a particular channel message, so as to activate the service functions (e.g., the locking function, and the like) immediately when power of the user mobile communication terminal 2 is turned on again.

In this case, although power of the user mobile communication terminal 2 is turned off again or a battery of the user mobile communication terminal 2 is removed, when power of the user mobile communication terminal 2 is turned on again, the PICS control agent can continuously execute the previous operation (e.g., performing the locking function, and the like). It is also possible to prevent key input while the locking function is executed, and power of the user mobile communication terminal 2 may be turned off only when the battery is removed.

Also, after the user mobile communication terminal 2 enters the service shadow area, when a pre-set time continues (i.e., when a pre-set time lapses), the service functions of the PICS control agent may be automatically activated (by the state controller and the function controller) to perform the locking function, which may be released only when a password is input. The password may be a general password previously set in the user mobile communication terminal 2 by the user, which may be discriminated from the password for releasing the activated service functions of the PICS agent executed when the user mobile communication terminal 2 is lost. But the present invention is not meant to be limited thereto.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

What is claimed is:

1. A method for providing a personal information control service for a mobile communication terminal, the method comprising:
    transmitting, by a service client, a loss registration control command to a service operating system;
    configuring, by the service operating system, a loss notification control message in the form of an SMS message or a particular channel message in response to the loss registration control command;
    transmitting the configured loss notification control message to a user mobile communication terminal; and
    receiving, by a control agent provided in the user mobile communication terminal, the loss notification control message, and activating a service function of the control agent to protect personal information of the user mobile communication terminal,
    wherein when the service operating system configures the loss notification control message in the form of an SMS message, and the configuring of the loss notification control message comprises:
    inserting service identification information for identifying a corresponding service into any one of a teleservice ID (TID) field of the SMS message or a particular position of the data field, and
    inserting a determined form of loss notification information indicating that the user mobile communication terminal has been lost into the data field of the SMS message.

2. A method for providing a personal information control service for a mobile communication terminal, the method comprising:
    transmitting, by a service client, a loss registration control command, to a service operating system;
    configuring, by the service operating system, a loss notification control message in the form of an SMS message or a particular channel message in response to the loss registration control command;
    transmitting the configured loss notification control message to a user mobile communication terminal; and
    receiving, by a control agent provided in the user mobile communication terminal, the loss notification control message, and activating a service function of the control agent to protect personal information of the user mobile communication terminal,
    wherein the particular channel message is one of a paging channel message and a traffic channel message and comprises at least one of identification information for identifying a corresponding service and loss notification information notifying that the user mobile communication terminal has been lost.

3. The method of claim 2, wherein when the service operating system configures the loss notification control message in the form of an SMS message, the configuring of the loss notification control message comprises:
    inserting service identification information for identifying a corresponding service into a teleservice ID (TID) field of the SMS message and inserting a determined form of loss notification information notifying of the loss of the user mobile communication terminal into a data field of the SMS message.

4. The method of claim 3, wherein the activating of the service function comprises:
    checking, by the control agent, the TID field of the loss notification control message to ascertain that the loss notification control message is a corresponding service message;
    reading the data field of the loss notification control message to recognize that the user mobile communication terminal has been lost; and
    activating the service function and changing the user mobile communication terminal into a loss state.

5. The method of claim 2, wherein when the service operating system configures the loss notification control message in the form of the SMS message, the configuring of the loss notification control message comprises:

inserting a determined form of loss notification information indicating that the user mobile communication terminal has been lost into the data field of the SMS message and inserting service identification information for identifying the corresponding service into a particular position of the data field.

6. The method of claim 5, wherein the activating of the service function comprises:
checking, by the control agent, a particular position of the loss notification control message to ascertain that the loss notification control message is a corresponding service message;
analyzing the data field of the loss notification control message to ascertain the loss notification; and
activating the service function and changing the user mobile communication terminal into a loss state.

7. The method of claim 2, further comprising:
transmitting, by the service client, an operation control command to the service operating system in a state that the service function of the control agent is activated;
configuring, by the service operating system, an operation control message in a form of an SMS message, a particular channel message or a TCP/IP communication message in response to the operation control command;
transmitting the configured operation control message to the user mobile communication terminal; and
receiving, by the control agent, the operation control message and controlling the user mobile communication terminal according to a control command word included in the operation control message.

8. The method of claim 7, further comprising:
transmitting, by the control agent, a control result to the service operating system; and
transmitting, by the service operating system, the received control result to the service client.

9. The method of claim 2, further comprising:
transmitting, by the service client, the operation control command to the service operating system in a state that the service function of the control agent is activated;
originating, by the service operating system, a call to the user mobile communication terminal by using a particular origination number for identifying the operation control command in response to the operation control command;
analyzing, by the control agent, the origination number to identify the operation control command; and
controlling the user mobile communication terminal according to the operation control command.

10. A method for providing a personal information control service for a mobile communication terminal, the method comprising:
transmitting, by a service client, a loss registration control command to a service operating system;
originating, by the service operating system, a call to a user mobile communication terminal by using a particular origination number in response to the loss registration control command;
analyzing, by a control agent provided in the user mobile communication terminal, the origination number; and
activating a service function of the control agent to protect personal information of the user mobile communication terminal based on the analysis,
further comprising:
encoding, by the service operating system, a particular code; and
adding the encoded code to the origination number.

11. The method of claim 10, wherein the analyzing of the origination number comprises:
checking the origination number of the call received by the user mobile communication terminal with an origination number table previously storing the origination number; and
identifying the origination number as a number indicating activation of the service function of the control agent based on the checking.

12. The method of claim 10, further comprising:
decoding, by the control agent, the encoded code; and
determining whether or not the call is a proper one by using the decoded code.

13. The method of claim 10, further comprising:
transmitting, by the service client, an operation control command to the service operating system in a state that the service function of the control agent is activated;
originating, by the service operating system, a call to the user mobile communication terminal by using a particular origination number for identifying the operation control command in response to the operation control command;
analyzing, by the control agent, the origination number to identify the operation control command; and
controlling the user mobile communication terminal according to the operation control command.

14. The method of claim 13, wherein the identifying of the operation control command comprises:
checking the origination number of the call received by the user mobile communication terminal with an origination number table previously storing the origination number; and
identifying that the origination number indicates the operation control command based on the checking.

15. The method of claim 10, further comprising:
transmitting, by the service client, the operation control command to the service operating system in the state that the service function of the control agent is activated;
configuring, by the service operating system, an operation control message in a form of an SMS message, a particular channel message or a TCP/IP communication message in response to the operation control command;
transmitting the configured operation control message to the user mobile communication terminal; and
receiving, by the control agent, the operation control message and controlling the user mobile communication terminal according to a control command word included in the operation control message.

16. A system for providing a personal information control service for a mobile communication terminal, the system comprising:
a service client configured to transmit a control command to protect personal information of a user mobile communication terminal;
a service operating system configured to receive the control command from the service client, and transmit control information to the user mobile communication terminal by using at least one of a method of configuring a particular form of control message corresponding to the control command and transmitting the configured control message to the user mobile communication terminal and a method of originating a call to the user mobile communication terminal by using an origination number for identifying the control command; and
a control agent provided in the user mobile communication terminal and transitioning to an active state based on the control information to perform a service function to protect information of the user mobile communication terminal, wherein the control command comprises a loss registration control command and an operation control command, and wherein if the service operating system employs the method of configuring a particular form of control message corresponding to the control command and transmitting the configured control message to the user mobile communication terminal, the service operating system configures a loss notification control message and an operation control message respectively corresponding to the loss registration control command and the operation control command and transmits the configured loss notification control message and the configured operation control message.

17. The system of claim 16, wherein the control agents transitions to the active state according to the loss notification control message, and controls the user mobile communication terminal according to the operation control message in the active state.

18. The system of claim 16, wherein the service operating system configures at least one of the loss notification control message and the operation control message in the form of an SMS message.

19. The system of claim 18, wherein the service operating system inserts information into at least one of a teleservice ID (TID) and a data field of the SMS message to configure one of the loss notification control message and the operation control message.

20. The system of claim 16, wherein the service operating system configures at least one of the loss notification control message and the operation control message in the form of a paging control message or a traffic channel message.

21. The system of claim 16, wherein after the control agent controls the user mobile communication terminal, it transmits a control result to the service operating system, and the service operating system transmits the control result to the service client.

22. The system of claim 21, wherein the control agent receives the operation control message and transmits the control results by interworking with the service operating system through TCP/IP communication in the active state.

23. The system of claim 16, wherein the control agent stores specific identification information of a universal subscriber identity module (USIM) inserted in the user mobile communication terminal in a file system of the user mobile communication terminal, and stores specific identification information of the user mobile communication terminal in a file system of the USIM.

24. The system of claim 23, wherein the control agent comprises an additional function of comparing the specific identification information of the USIM stored in the file system of the user mobile communication terminal and the specific identification information of the USIM inserted in the user mobile communication terminal when the user mobile communication terminal is booted, and transitioning to the active state if the both identification information are not identical.

25. The system of claim 23, wherein when the user mobile communication terminal is booted, the control agent compares the specific identification information of the user mobile communication terminal stored in the file system of the USIM and the specific identification information of the user mobile communication terminal, and if the both identification information are not identical, the control agent transitions to the active state.

26. The system of claim 16, wherein the service function includes at least one of a terminal locking function, a ciphering key deleting/concealing function, a data management function, a location transmission function, an image information providing function, a voice information providing function, an updating function, an information output function, a call limiting function, a loss releasing function, a forcible driving function, and a control result reporting function.

27. The system of claim 26, wherein the ciphering key deleting/concealing function is ciphering data, security subjects, with a particular ciphering key, keeping the ciphered data in storage in the user mobile communication terminal and separately keeping the ciphering key in storage when the user mobile communication terminal is in a normal state, and performing backup the ciphering key to a personal information control service (PICS) operating server via a network and then deleting or concealing the ciphering key when the user mobile communication is lost.

28. A control apparatus provided in a user mobile communication terminal, the apparatus comprising:

a state controller configured to change the control apparatus into an active state if a loss notification control message transmitted from an external particular system is received or if a call from an activation origination number is received; and a function controller driven in the active state and controls the user mobile communication terminal if an operation control message transmitted from the particular system is received or if a call from an operation control origination number is received, wherein the state controller further comprises a function of storing specific identification information of a universal subscriber identity module (USIM) inserted in the user mobile communication terminal in a file system of the user mobile communication terminal, storing specific identification information of the user mobile communication terminal in a file system of the USIM, and when the user mobile communication terminal is booted, transitioning to the active state by using the specific identification information of the USIM and the specific identification information of the user mobile communication terminal.

* * * * *